United States Patent [19]
Tozuka

[11] Patent Number: 6,003,921
[45] Date of Patent: Dec. 21, 1999

[54] LUGGAGE ROOM STRUCTURE OF A VEHICLE AND A CONNECTING MEMBER USED FOR THE STRUCTURE

[75] Inventor: Akito Tozuka, Kanagawa-ken, Japan

[73] Assignee: Nissan Motor Co., Ltd., Kanagawa-ken, Japan

[21] Appl. No.: 08/932,954

[22] Filed: Sep. 18, 1997

[30] Foreign Application Priority Data

Sep. 19, 1996 [JP] Japan .................................. 8-248147

[51] Int. Cl.$^6$ ....................................................... B60N 3/12
[52] U.S. Cl. ........................ 296/37.2; 296/37.3; 224/42.2
[58] Field of Search .................................. 296/37.2, 37.3; 224/42.2, 42.12

[56] References Cited

U.S. PATENT DOCUMENTS 4,423,900  1/1984  Sugimoto et al. .
4,687,124  8/1987  Mahr .

FOREIGN PATENT DOCUMENTS 63-19447    2/1988  Japan .
WO 89/07569 8/1989  WIPO .

Primary Examiner—Joseph D. Pape
Assistant Examiner—Kiran Patel
Attorney, Agent, or Firm—McDermott, Will & Emery

[57] ABSTRACT

A movable luggage board is arranged in such a manner as to cover a tire well provided on a luggage floor in a vehicle. The luggage board is connected to a floor structure body by a tether so that a movable range is limited. The tire well has a depth in correspondence to a tire width of a temporary use spare tire having a narrow width. A length of the tether is set to a dimension such that the luggage board can move to a position to be mounted in a substantially horizontal manner on an attached tire projecting above the tire well in a state where the attached tire having a wide width is housed within the tire well. Accordingly, an increased height within a luggage room at a normal state can be secured and the attached tire having a wide width can be housed within the tire well.

16 Claims, 6 Drawing Sheets

LUGGAGE ROOM STRUCTURE OF A VEHICLE AND A CONNECTING MEMBER USED FOR THE STRUCTURE

The content of Application No. TOKUGANHEI 8-248147 filed Sep. 19, 1996, in Japan is hereby incorporated by reference.

BACKGROUND OF THE INVENTION

The present invention relates to a luggage room structure for covering a tire well provided within a luggage room of a vehicle and to a connecting member used for this structure.

Conventionally, this type of luggage room structure for a vehicle is described in Japanese Utility Model Unexamined Publication No. 63-19447.

In the above structure, a luggage board is movably arranged in such a manner as to cover the tire well provided in a luggage floor within the luggage room. The luggage board is mounted on a floor structure body.

At a normal state, a temporary use spare tire having a narrow width such as a Tempa Spare Tire is housed within the tire well. However, when a tire attached to the vehicle body (an attached tire) is punctured, the temporary use spare tire is attached in place of the punctured tire so that the attached tire having a wide width is housed within the tire well in place of the temporary use spare tire. Accordingly, the tire well has a depth in correspondence to the width of the tire having a wide width so as to receive both of the tires. At a normal state where the temporary use spare tire is housed, a space is formed between the temporary use spare tire and the luggage board within the tire well and a container is arranged in this space.

SUMMARY OF THE INVENTION

However, in the above luggage room structure, since a depth of the tire well is set in correspondence to a tire width of the attached tire having a wide width, a height of the luggage floor increases and a height of the luggage room decreases at that degree so that there occurs a problem that a luggage having a large height can not be housed.

Further, in the case that the attached tire having a wide width is housed within the tire well, it is necessary to move the container and articles housed in the container so that there occurs a problem concerning a space for housing the container and the articles.

The present invention is made by taking the above described problems into consideration and an object of the present invention is to provide a luggage room structure for a vehicle which can secure an increased height within a luggage room at a normal state and can house an attached tire having a wide width within a tire well.

In order to achieve the above object, the luggage room structure for a vehicle in accordance with the present invention comprises a tire well, a floor structure body a luggage board, and a connecting member. The tire well is provided within the luggage room, has an opening in an upper portion thereof, from which a temporary use spare tire and the attached tire is selectively housed, and has a depth such that when the temporary use spare tire is housed, an upper portion thereof does not project above the opening and that when the attached tire having a width wider than that of the temporary use spare tire is housed, an upper portion thereof projects above the opening. The floor structure body is provided adjacent to the tire well. The luggage board is arranged at a first position in which it covers the opening of the tire well when the attached tire is not housed and is provided in such a manner as to move at least upward from the first position. The connecting member connects the luggage board with the floor structure body, thereby limiting a moving range of the luggage board with respect to the tire well and further allowing the luggage board moving to a second position in which the attached tire housed within the tire well is covered with the luggage board.

In the above structure, the tire well has the depth in correspondence to a tire width of the temporary use spare tire having a narrow width so that at a normal state where the temporary use spare tire is housed, the luggage board is arranged at the low first position. Accordingly, at the normal state, the height of the luggage room is largely secured so that a luggage having a large height can be housed within the luggage room.

Further, in the case that the attached tire having a wide width is housed within the tire well, the luggage board is arranged at a second position and the attached tire is covered above with the luggage board. At this time, the luggage board is connected to the floor structure body by the connecting member and the moving range thereof is limited by the connecting member. Accordingly, the luggage board is not widely slipped out of place from the second position.

Still further, the floor structure body may be arranged in front of the vehicle with respect to the luggage board so that an front end portion of the luggage board in the vehicle direction may be connected to an rear end portion of the floor structure body in the vehicle direction by the connecting member.

In the above structure, since the front end portion of the luggage board is connected to the floor structure body by the connecting member, an upward motion of the front end portion of the luggage board is limited by the connecting member. Accordingly, even in the case that the front end portion of the luggage board is pressed downward when the luggage board is positioned at the second position for covering the above of the attached tire, a turn over of the luggage board to the rear side of the vehicle can be prevented so that a state of the luggage board arranged at the second position becomes stable.

Furthermore, the floor structure body may be fixed to a vehicle body panel by a fastening member and the connecting member may be coupled to the floor structure body by the fastening member.

In the above structure, since the connecting member is fastened to the vehicle body panel together with the floor structure body, an operation of coupling the connecting member to the floor structure body can be omitted so that an increase of operation steps can be controlled as less as possible.

Moreover, the luggage room can be opened by a luggage opening having a lower edge arranged at a position lower than the luggage board arranged at the first position, higher than a bumper arranged in the rear side of the vehicle, and having a width wider than that of the luggage board, the connecting member can be structured such as to allow the front end of the luggage room in the rear side of the vehicle reaching above the lower edge of the luggage opening when the luggage board moves from the first position to the rear side of the vehicle.

In the above structure, since the front end of the luggage board can be moved above the lower edge of the luggage opening, a person can sit on the luggage board from the rear side of the luggage room close to the rear end of the vehicle, thereby preventing the clothes from being got dirt.

Further, by providing the connecting member which allows moving above the bumper positioned at the front end of the luggage board, a space can be secured between the bumper which is often dirty and legs of the sitting person so that the person can sit without any contact with the bumper, thereby further securely preventing the clothes and legs from being got dirt.

DESCRIPTION OF THE PREFERRED EMBODIMENTS

Figure 1:
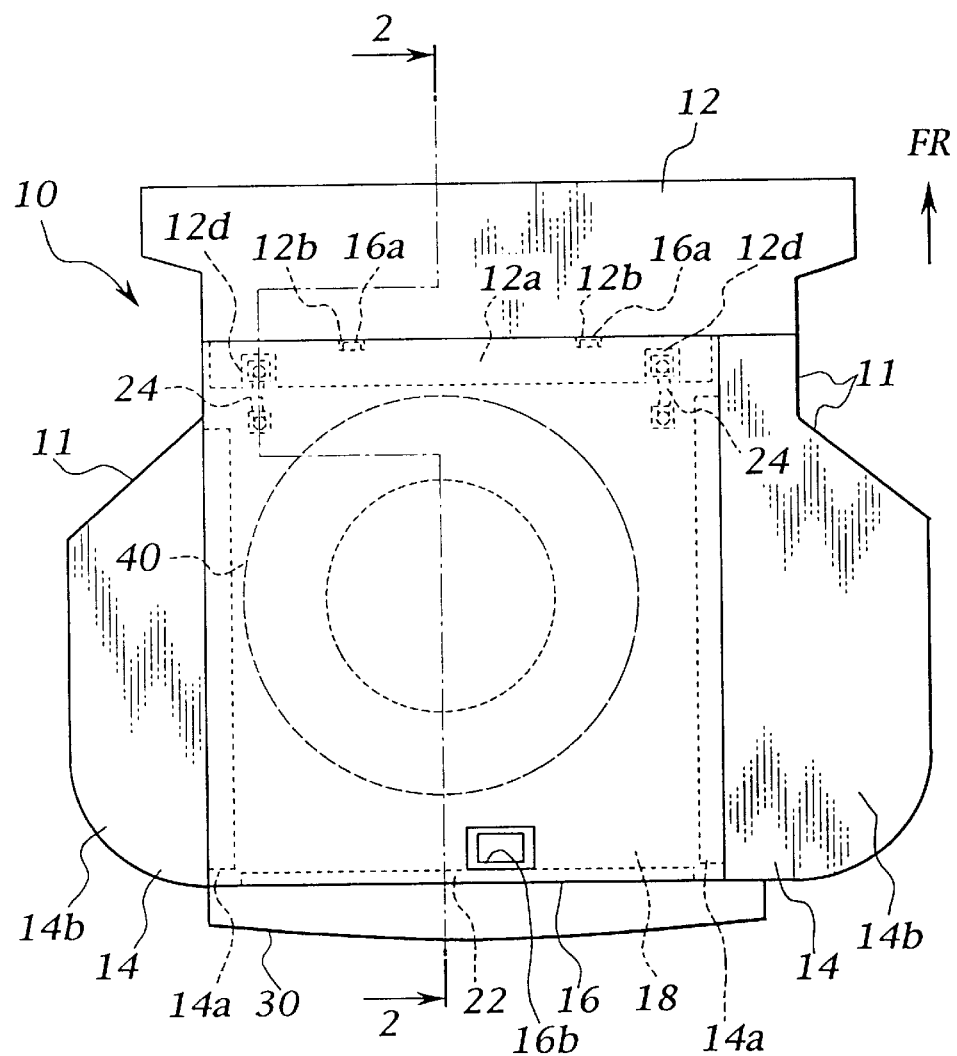
FIG. 1 is a plan view which shows an embodiment of a luggage room structure for a land vehicle in accordance with the present invention.

An embodiment in accordance with the present invention will be explained below with reference to the attached drawings. FIG. 1 is a plan view which shows a luggage board structure for a land vehicle in accordance with the present embodiment, FIG. 2 is a cross sectional view as seen along a line 2—2 of FIG. 1 and FIG. 6 is a perspective view of a land vehicle as seen from a rear side thereof.

Figure 6:
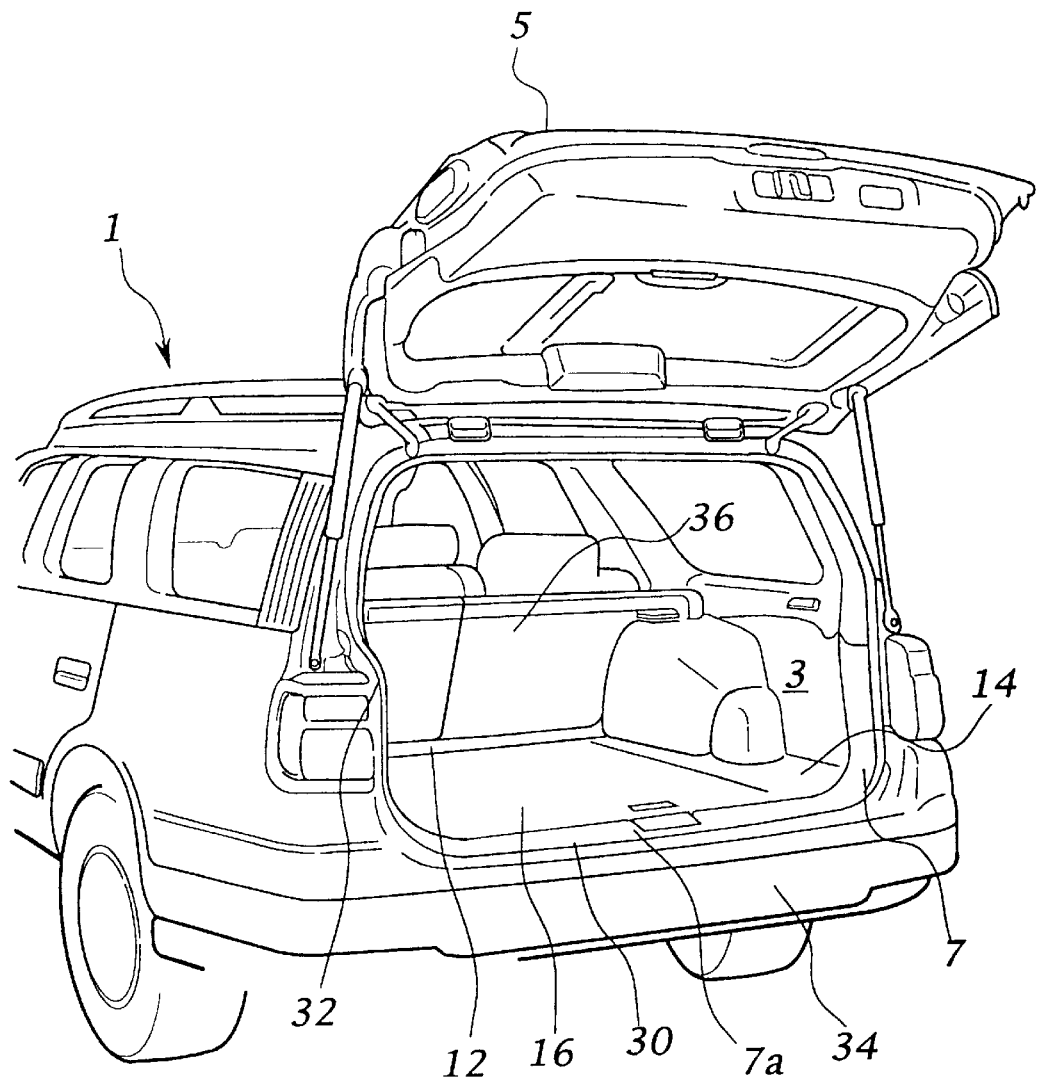
FIG. 6 is a perspective view as seen from a rear side which shows a land vehicle provided with a luggage room structure shown in FIG. 1.

As shown in FIG. 6, a luggage room 3 is provided at a rear side of a land vehicle. The luggage room 3 has a luggage opening 7 which is closed by a back door 5, and is opened rearward by the luggage opening 7.

Figure 2:
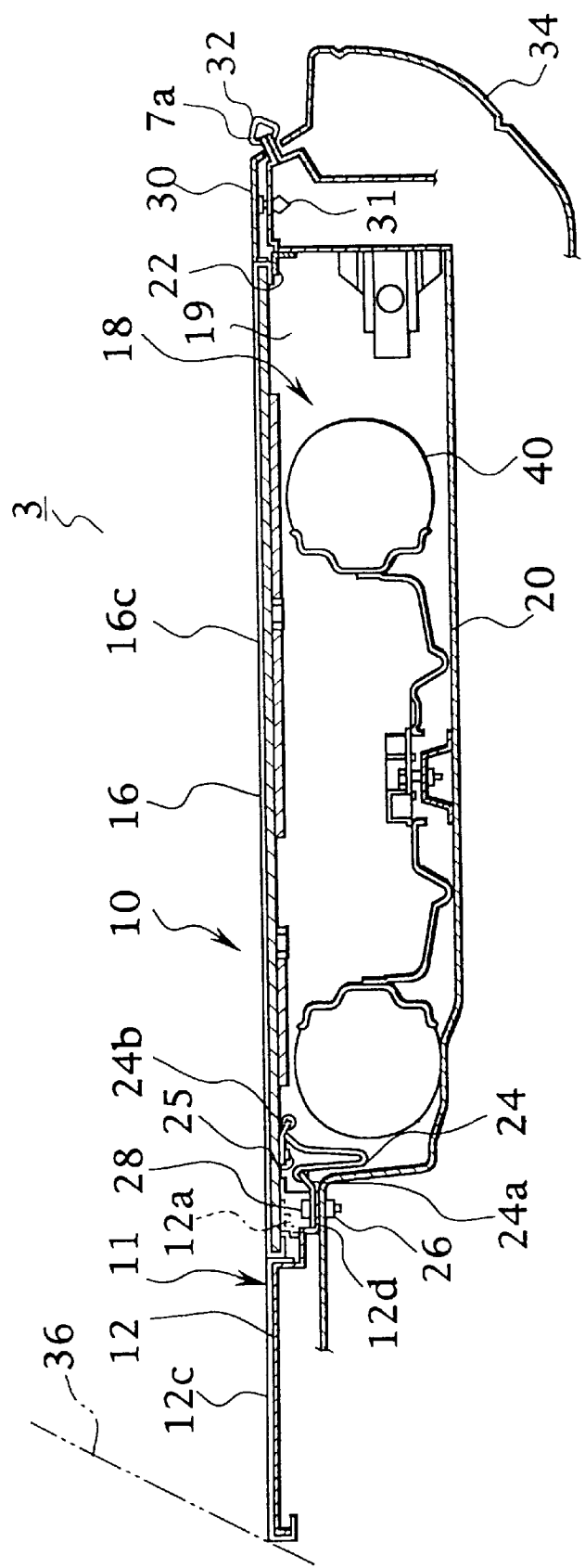
FIG. 2 is a cross sectional view along a line 2—2 in FIG. 1 which shows the structure shown in FIG. 1 in a state that a temporary use spare tire having a narrow width is housed within a tire well at a normal time.

As shown in FIGS. 1 and 2, a luggage floor 10 is provided at a front portion and both side portions of the luggage room 3. The luggage floor 10 comprises a luggage floor front trim 12 and luggage floor side trims 14 corresponding to a floor structure 11.

A tire well 18 in which a temporary use spare tire for use during an emergency is housed is provided in a portion other than the floor structure 11 within the luggage room 3. As shown in FIG. 2, the tire well 18 is defined by a recess portion formed in a rear floor panel 20 (a vehicle body panel) and has an opening 19 in an upper portion thereof. At a normal time, a temporary use spare tire 40 having a narrow width is housed within the tire well 18. A depth of the tire well 18 is set to a dimension such that an upper portion of the housed temporary use spare tire 40 does not project upward from the opening 19, that is, a dimension obtained by adding a little gap to a width of the temporary use spare tire 40. In this case, the little gap mentioned above is used for absorbing a dimensional error of the tire width so that it is controlled as little as possible.

The opening 19 of the tire well 18 is covered with a luggage board 16 at a normal time. Supporting surfaces 12a and 14a arranged at a position a little lower than a common surface thereof are formed in end portions of the luggage floor front trim 12 and of the luggage floor side trims 14 close to the tire well 18, respectively. An L-shaped bracket 22 is fixed to a rear portion of the rear floor panel 20. The luggage board 16 is arranged at a first position by being mounted on these supporting surfaces 12a and 14a and the L-shaped bracket 22. The luggage board 16 arranged at the first position forms a substantially horizontal surface which corresponds to the same plane as that of the luggage floor front trim 12 and the luggage floor side trims 14, and a luggage can be mounted on this substantially horizontal surface. Upper surfaces of the luggage floor front trim 12, the luggage floor side trims 14 and the luggage board 16 are covered with carpet materials 12c, 14b and 16c, respectively.

An engaging stopper portion 16a is formed at a front end of the luggage board 16, and the engaging stopper portion 16a is engaged with an engaging stopper hole 12b formed on the supporting surface 12a. Accordingly, when the operator holds a grip hole 16b provided on a rear portion of the luggage board 16 by hand and lifts up the luggage board 16, the luggage board 16 can be rotated around the engaging stopper portion 16a. Further, the luggage board 16 can be wholly moved by lifting the front portion of the luggage board 16 and removing the engaging stopper portion 16a from the engaging stopper hole 12b.

The luggage board 16 is connected to the luggage floor front trim 12 by a band-like tether 24 serving as a connecting member having an elasticity. A mounting bracket 24a fixed to an end portion of the tether 24 and a mounting bracket 24b fixed to the other end portion of the tether 24 are mounted to the rear end portion of the luggage floor front trim 12 and to a tail surface of the front end portion of the luggage board 16 by screws 25, respectively. A movable range of the luggage board 16 with respect to the floor structure body 11 (a movable range with respect to the tire well 18) is limited by the tether 24.

The mounting bracket 24a is fixedly fastened to a weld nut 26 fixedly attached to the rear floor panel 20 by a bolt 28 together with a mounting portion 12d provided in the rear end portion of the luggage floor front trim 12. Accordingly, the luggage floor front trim 12 is mounted to the rear floor panel 20 and in addition to this, one end of the tether 24 is mounted to the luggage floor front trim 12 so that mounting operation is made common.

A tail gate kicking plate 30 is disposed in the rear side of the luggage floor 10, the tail gate kicking plate 30 being mounted to the rear floor panel 20 by a clip 31 and forming the same surface as that of the floor structure body 11 and the luggage board 16. A weather strip 32 closely brought into contact with the back door 5 at a time of closing the back door 5 is disposed in a peripheral edge of the luggage opening 7 arranged in the rear side of the tail gate kicking plate 30. A rear bumper 34 is disposed in the rear side of the luggage opening 7. A lower edge 7a of the luggage opening 7 is arranged at a position lower than that of the luggage board 16 disposed at a first position and higher than that of the rear bumper 34, and has a width wider than that of the luggage board 16. A rear seat back 36 is disposed in the front side of the luggage floor 10.

In the luggage room structure having the above construction, the tire well 18 which houses the temporary use spare tire 40 at a normal time is formed such as to have a depth in correspondence to the tire width of the temporary use spare tire 40 having a narrow width so that a gap formed above the temporary use spare tire 40 becomes significantly narrow. As a result, the luggage floor 10 is lowered and the height of the luggage room 3 is increased. Accordingly, the luggage having a large height can be housed.

Next, at a time of emergency when an attached normal sized tire 42 is punctured, the temporary use spare tire 40 is used and the attached tire 42 is housed within the tire well 18 in place of the temporary use spare tire 40. This state is shown in FIG. 3.

The attached tire 42 having a wide width is housed within the tire well 18 in a state that the tire projects from the opening 19, since the width of the tire 42 is larger than the depth of the tire well 18. In comparison with this, the length of the tether 24 is set to a dimension such as to move to a position (a second position) in which the luggage board 16 is mounted on the attached tire 42 in a substantially horizontal manner. The luggage board 16 covers the attached tire 42 in a state of being mounted at the second position in a substantially horizontal manner so as to serve a partition between luggages.

Since the tether 24 is mounted to the front end portion of the luggage board 16, the upward movement of the front end portion of the luggage board 16 can be limited by the tether 24. Accordingly, if a person puts his hands on the rear end portion of the luggage board 16 in a direction of an arrow 13 of the vehicle direction, a turn over of the luggage board 16 to the rear side can be limited, thereby preventing the luggage from jumping.

Figure 3:
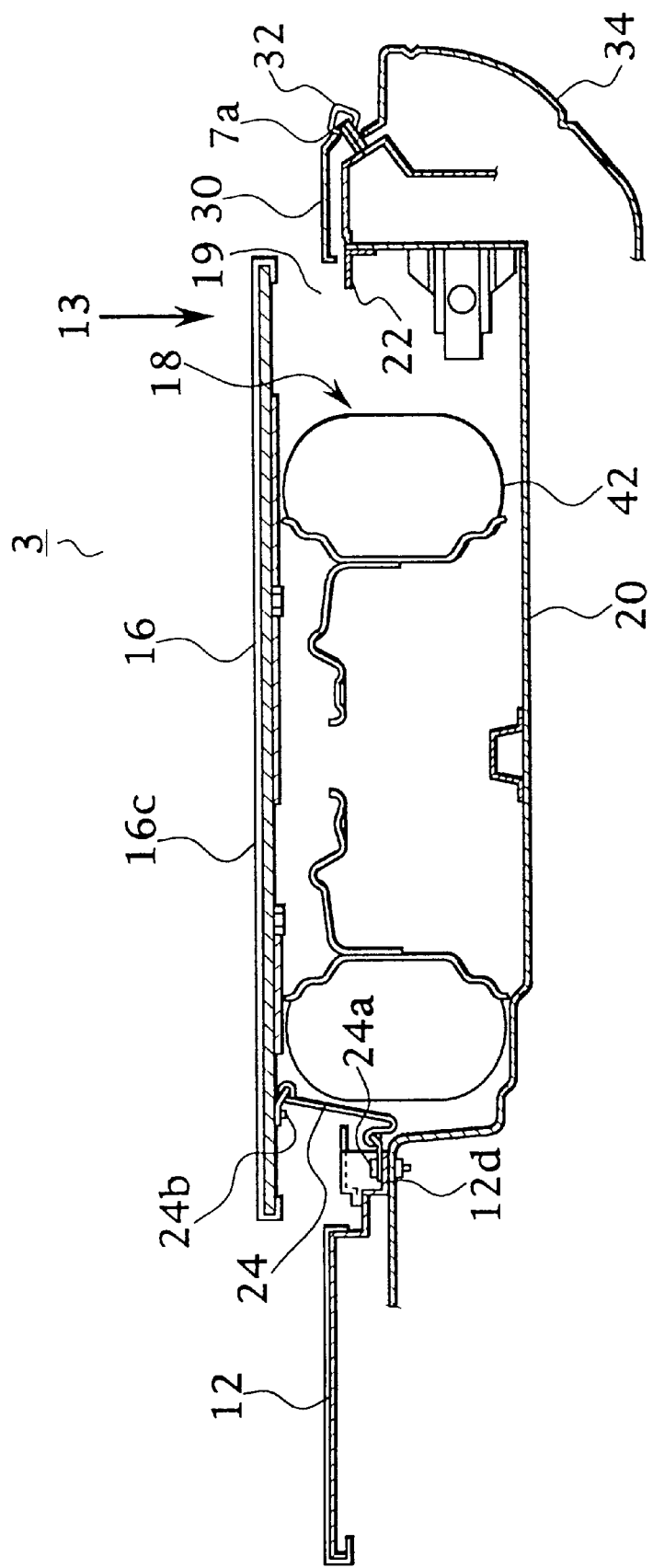
FIG. 3 is a cross sectional view along a line 2—2 in FIG. 1 which shows the structure shown in FIG. 1 in a state that an attached tire having a wide width is housed within a tire well at an emergency time.
Figure 4:
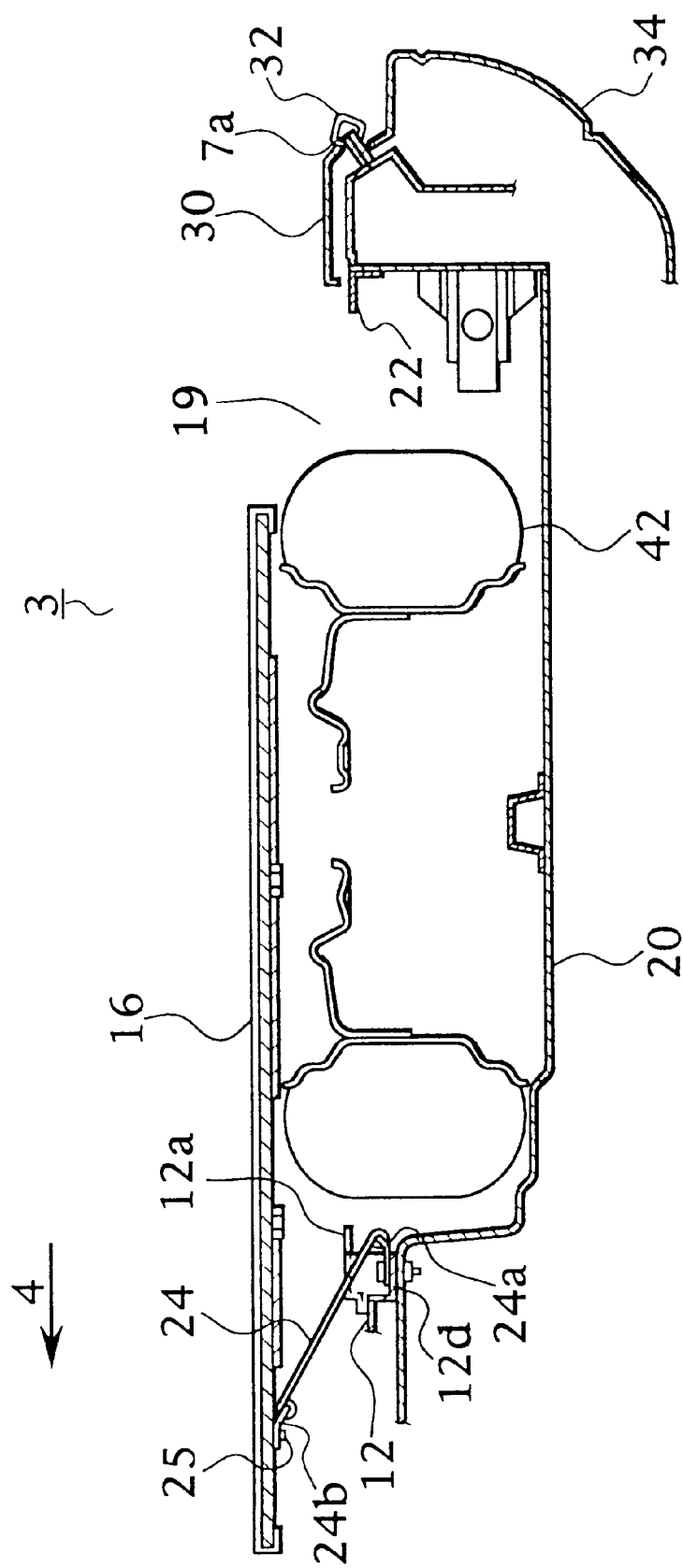
FIG. 4 is a cross sectional view along a line 2—2 in FIG. 1 which shows the structure shown in FIG. 1 in a state that a luggage board is forward slipped out of place.

Further, a state in which an inertial force 4 to a forward direction is applied to the luggage board 16 when the braking operation is performed during a drive in the state shown in FIG. 3 is shown in FIG. 4. A forward movement of the luggage board 16 is limited to a state shown in FIG. 4 by the tether 24 so that the luggage board 16 does not project forward. It is preferable to set the length of the tether 24 to a dimension such that the luggage board 16 can maintain the substantially horizontal state without being out of place from the attached tire 42 housed within the tire well 18 even in a state that the tether 24 is tensioned. Further, it is preferable that the mounting bracket 24b is provided with a tapered surface which gradually move in close to the luggage board 16 from the rear side to the front side as shown in the drawing in order not to apply a vertical force to the luggage board 16 through the tether 24. By doing so, since the tensional force from the tether 24 acts in a tangential direction of the luggage board 16 in the state shown in FIG. 4, generation of unnecessary moment of rotations in the luggage board 16 can be controlled.

As mentioned above, even if the attached tire 42 having a wide width is housed within the tire well 18, the luggage board 16 can be suitably operated by mounting the luggage board 16 on the attached tire 42 in a substantially horizontal manner.

Figure 5:
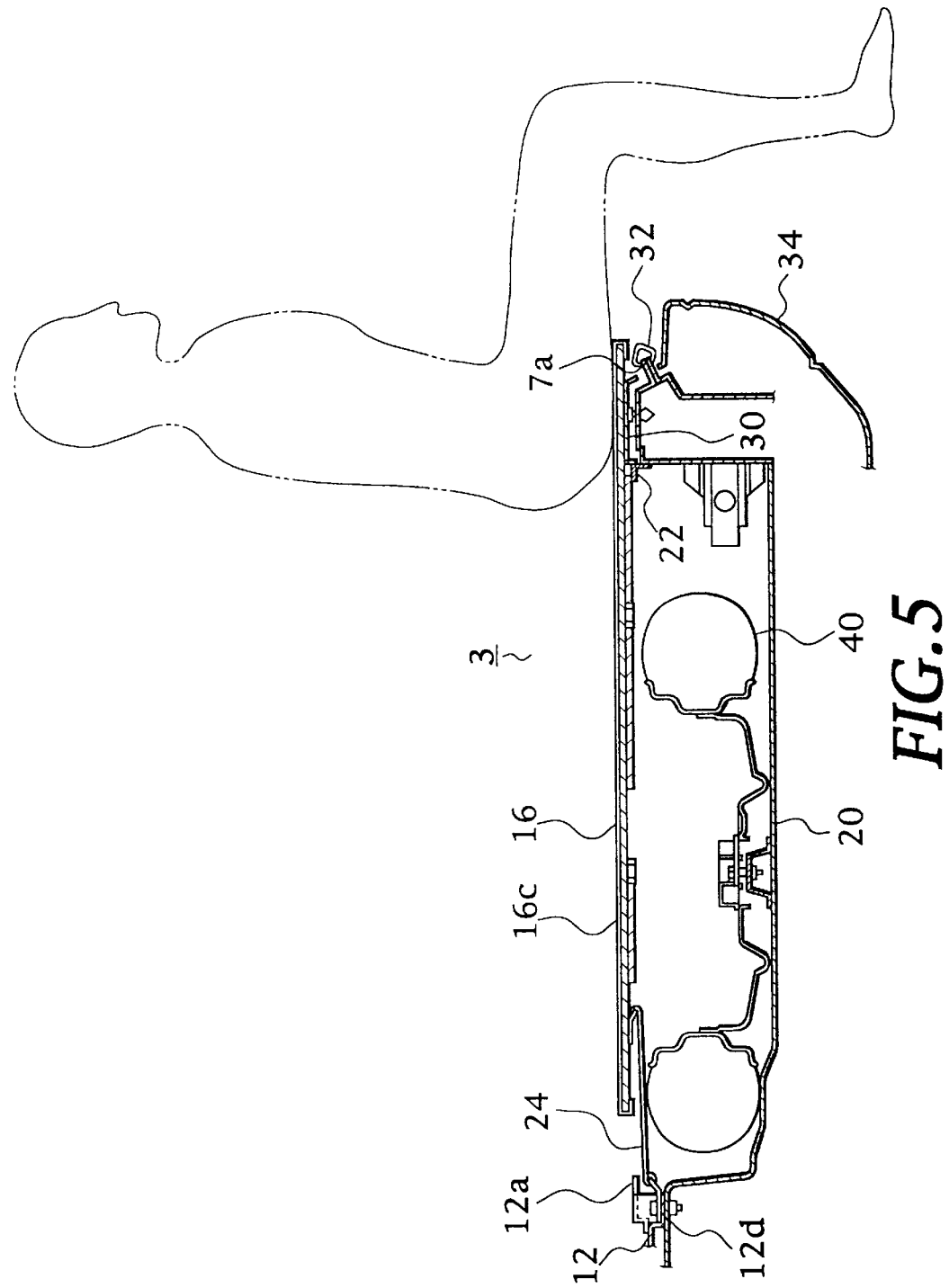
FIG. 5 is a cross sectional view along a line 2—2 in FIG. 1 which shows the structure shown in FIG. 1 in a state that a luggage board is rearward slipped out of place.

FIG. 5 shows another embodiment for use of the present embodiment and shows a case in which a length of the tether 24 is set to a dimension such that the luggage board 16 reach the upper portion of the tail gate kicking plate 30 and the front end of the luggage board 16 reach the upper portion of the rear bumper 34. In the case that the temporary use spare tire 40 is housed within the tire well 18 at a normal time, a person can sit on the luggage board 16 from an outward position by moving the luggage board 16 rearward and opening the back door. Accordingly, since the clothes of the person is not directly brought into contact with the tail gate kicking plate 30, the clothes is not got dirty. Further, it is possible to sit on the carpet material 16c disposed on the upper surface of the luggage board 16 and having a soft touch. Particularly, since the front end of the luggage board 16 is moved above the rear bumper 34, a space can be secured between the rear bumper 34 which is often dirty and legs of a sitting person so that the person can sit without any contact with the rear bumper 34.

What is claimed is:

1. A luggage room structure for a vehicle comprising:
    a tire well provided within a luggage room, the tire well having an opening in an upper portion thereof, a temporary use spare tire or a normal sized tire is selectively housed in the tire well through the opening, and the tire well having a depth such that when the temporary use spare tire is housed, an upper portion thereof does not project above the opening and that when the normal sized tire having a width wider than that of the temporary use spare tire is housed, an upper portion thereof projects above the opening;
    a floor structure body provided adjacent to the tire well;
    a luggage board arranged at a first position in which the luggage board covers the opening of the tire well when the attached tire is not housed and provided in such a manner as to be movable at least upward from the first position; and
    a connecting member connecting the luggage board with the floor structure body, thereby limiting a moving range of the luggage board with respect to the tire well; wherein
    said connecting member allows the luggage board to move to a second position in which the normal sized tire housed within the tire well is covered with the luggage board.

2. A luggage room structure as claimed in claim 1, wherein
    said luggage board is supported at an edge portion of the opening so that surfaces of the luggage board and the floor structure body forms a same plane when the luggage board is arranged at said first portion, and said luggage board is supported at a side surface portion of the normal sized tire when the luggage board is arranged at said second position.

3. A luggage room structure as claimed in claim 2, wherein
    said normal sized tire is housed within the tire well, and
    said luggage board is supported by the side surface portion of the normal sized tire in a substantially horizontal manner when the luggage board is arranged at said second position.

4. A luggage room structure as claimed in claim 1, wherein
    said floor structure body is arranged in a front side of the luggage board in a vehicle direction, and
    said connecting member connects a front end portion of the luggage board in the vehicle direction to a rear end portion of the floor structure body in the vehicle direction.

5. A luggage room structure as claimed in claim 4, wherein
    the front end portion of the luggage room in the vehicle direction engages with the floor structure body when the luggage board is arranged at said first position.

6. A luggage room structure as claimed in claim 1, further comprising:
    a seat arranged in the front side of the floor structure body in a vehicle direction, wherein
    said connecting member inhibits contact between the luggage board and the seat when the luggage board moves from said second position to the front side of the vehicle.

7. A luggage room structure as claimed in claim 1, wherein
said luggage board includes a carpet for covering a surface thereof.

8. A luggage room structure as claimed in claim 1, wherein
said floor structure body includes a carpet for covering a surface thereof.

9. A luggage room structure as claimed in claim 1, wherein
said floor structure body is arranged at a front side and both sides of the luggage board in a vehicle direction.

10. A luggage room structure as claimed in claim 1, wherein
said floor structure body is fixed to a vehicle body panel by a fastening member, and
said connecting member is coupled to the floor structure body by said fastening member.

11. A luggage room structure as claimed in claim 1, further comprising:
a luggage opening for opening the luggage room, wherein
said luggage opening has a lower edge,
said lower edge is arranged at a position lower than the luggage board disposed at said first position and higher than a bumper disposed in a rear portion of the vehicle, said lower edge has a width wider than a width of the luggage board, and
said connecting member allows a front end of a rear side of the luggage board in a vehicle direction reaching an upper portion of the bumper when the luggage board moves from said first position to the rear side of the vehicle.

12. A luggage room structure as claimed in claim 11, further comprising:
a kicking plate arranged between the tire well and the bumper, wherein
the kicking plate supports a rear end portion of the luggage board in the vehicle direction when the front end of the rear side of the luggage board in the vehicle direction reach the upper portion of the bumper.

13. A luggage room structure as claimed in claim 1, wherein
said connecting member has an elasticity and is bent when the luggage board is arranged at the first position.

14. A connecting member used for a luggage room structure for a vehicle including a tire well provided within a luggage room, the tire well having an opening in an upper portion thereof, a temporary use spare tire or a normal sized tire is selectively housed in the tire well through the opening, and the tire well having a depth such that when the temporary use spare tire is housed, an upper portion thereof does not project above the opening and that when the normal sized tire having a width wider than that of the temporary use spare tire is housed, an upper portion thereof projects above the opening, a floor structure body provide adjacent to the tire well and a luggage board arranged at a first position in which the luggage board covers the opening of the tire well when the normal sized tire is not housed and provided in such a manner as to be movable at least upward from the first position, said connecting member comprising;
one end portion having a first bracket coupled to a lower surface of the luggage board;
the other end portion having a second bracket coupled to the floor structure body; wherein
said connecting member limiting a moving range of the luggage board with respect to the tire well and allowing the luggage board to move to a second postion in which the normal sized tire housed within the tire well is covered with the luggage board.

15. A connecting member as claimed in claim 14, wherein
said connecting member has flexibility and is bent when the luggage board is arranged at the first position.

16. A vehicle having normal sized tires, the vehicle comprising:
a luggage room having a tire well for accommodating a temporary use spare tire narrower than a normal sized tire, the well being capable of receiving the normal sized tire when the spare tire is not present, the well having an upper opening and being of such a depth that the normal sized tire projects above the opening whereas the spare tire does not project above the opening;
a floor structure body adjacent the well;
a luggage board which is movable relative to the well; and
a connecting member which connects the luggage board with the floor structure body and which limits the range of movement of the luggage board relative to the well;
wherein the luggage board is movable at least upward from a first position in which the luggage board covers the opening of the well when the normal sized tire is not present in the well; and
wherein the luggage board is movable to a second position in which, when the normal sized tire is present in the well, the luggage board covers the normal sized tire and is supported by a side of the normal sized tire.

* * * * *